United States Patent
Egorov et al.

(10) Patent No.: US 9,735,447 B2
(45) Date of Patent: Aug. 15, 2017

(54) SILICONE-CONTAINING COMPOUND, ELECTROLYTE FOR LITHIUM SECONDARY BATTERY, LITHIUM SECONDARY BATTERY INCLUDING THE SAME, AND THE METHOD OF PREPARING THE SILICONE-CONTAINING COMPOUND

(71) Applicant: Samsung SDI Co., Ltd., Yongin-si, Gyeonggi-do (KR)

(72) Inventors: Vladimir Egorov, Yongin-si (KR); Woo-Cheol Shin, Yongin-si (KR); Soo-Jin Kim, Yongin-si (KR); Myung-Heui Woo, Yongin-si (KR); Hye-Jin Park, Yongin-si (KR); Si-Young Cha, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 332 days.

(21) Appl. No.: 14/286,914

(22) Filed: May 23, 2014

(65) Prior Publication Data
US 2015/0010811 A1 Jan. 8, 2015

Related U.S. Application Data

(60) Provisional application No. 61/843,847, filed on Jul. 8, 2013.

(51) Int. Cl.
| | | |
|---|---|---|
| *H01M 10/0567* | (2010.01) | |
| *H01M 10/052* | (2010.01) | |
| *H01M 4/13* | (2010.01) | |

(52) U.S. Cl.
CPC ......... *H01M 10/0567* (2013.01); *H01M 4/13* (2013.01); *H01M 10/052* (2013.01); *H01M 2300/0025* (2013.01); *Y02T 10/7011* (2013.01)

(58) Field of Classification Search
None
See application file for complete search history.

(56) References Cited

U.S. PATENT DOCUMENTS

| | | |
|---|---|---|
| 6,235,431 B1 | 5/2001 | Takechi et al. |
| 2006/0269846 A1 | 11/2006 | Xu et al. |
| 2009/0197167 A1 | 8/2009 | Olschimke |

(Continued)

FOREIGN PATENT DOCUMENTS

| | | |
|---|---|---|
| KR | 10-2008-0097599 A | 11/2008 |
| KR | 10-2008-0110160 A | 12/2008 |
| WO | WO 2013023902 * | 2/2013 |

OTHER PUBLICATIONS

EPO Examination report dated Sep. 1, 2016, for corresponding European Patent Application 14 162 751.3, (6 pages).

(Continued)

*Primary Examiner* — Sarah A Slifka
(74) *Attorney, Agent, or Firm* — Lewis Roca Rothgerber Christie LLP

(57) ABSTRACT

A silicone-containing compound is an additive for a lithium secondary battery electrolyte for improving high-temperature lifetime characteristics and/or high-temperature stability of a lithium secondary battery. An electrolyte for a lithium secondary battery includes the silicon-containing compound. A lithium secondary battery includes the electrolyte. A method of preparing the silicon-containing compound is also provided.

20 Claims, 5 Drawing Sheets

(56) References Cited

U.S. PATENT DOCUMENTS

2013/0011728 A1    1/2013  Tokuda et al.
2013/0177808 A1*   7/2013  Wang .................... C23C 16/402
                                                     429/219

OTHER PUBLICATIONS

EPO Search Report dated Nov. 11, 2014, for corresponding European Patent application 14162751.3, (6 pages).

* cited by examiner

SILICONE-CONTAINING COMPOUND, ELECTROLYTE FOR LITHIUM SECONDARY BATTERY, LITHIUM SECONDARY BATTERY INCLUDING THE SAME, AND THE METHOD OF PREPARING THE SILICONE-CONTAINING COMPOUND

CROSS-REFERENCE TO RELATED APPLICATION

This application claims priority to and the benefit of U.S. Provisional Application No. 61/843,847, filed on Jul. 8, 2013 in the U.S. Patent and Trademark Office, the entire contents of which are incorporated herein by reference.

BACKGROUND

1. Technical Field

One or more embodiments of the present invention are directed to a silicone-containing compound, an electrolyte for lithium secondary battery, a lithium secondary battery including the electrolyte, and a method of preparing the silicone-containing compound.

2. Related Art

Lithium secondary batteries are rechargeable at high rates and have energy densities that are about three times higher than conventional lead storage batteries, such as nickel-cadmium (Ni—Cd) batteries, nickel-hydrogen batteries, and nickel-zinc batteries. Thus, there has been increasing research and development intodirected to lithium secondary batteries.

In general, a lithium secondary battery includes a cathode, an anode, a separator disposed between the cathode and the anode, and an electrolyte. The electrolyte serves to transport lithium ions between the cathode and the anode.

These lithium ions may maintain charge neutrality by flowing together with electrons and may serve as media for storing electric energy in the electrodes. Accordingly, the amount of lithium ions intercalated into the electrode is important. Thus, to achieve high battery performance, an electrolyte with high ionic conductivity, high electrochemical stability, and high thermal stability is desired.

With the recent increasing demand for high-energy density lithium secondary batteries, for example, for use in electric vehicles, high-voltage electrode active materials have been used. By using a low-potential anode active material and a high-potential cathode active material, the range of electrochemical stability of the electrolyte may be narrower than the difference in potential between the anode and cathode active materials, and the lithium secondary may thus be more vulnerable to decomposition at the surface of the cathode and/or the anode, particularly at high temperatures. Lithium secondary batteries for electric vehicles and power storage systems are more likely to be exposed to high-temperature environments, and undergo rapid temperature increases from rapid charging and discharging. Such high-temperature environments may reduce the lifetime of batteries and the amount of energy stored therein.

SUMMARY

According to aspects of embodiments of the present invention, a silicone-containing compound is used as an additive in a lithium secondary battery electrolyte to improve high-temperature lifetime characteristics and high-temperature stability of the lithium secondary battery.

According to aspects of embodiments of the present invention, an electrolyte for a lithium secondary battery improves high-temperature lifetime characteristics and high-temperature stability of lithium secondary batteries.

According to aspects of embodiments of the present invention, a lithium secondary battery including the electrolyte has improved high-temperature lifetime characteristics and high-temperature stability.

One or more embodiments of the present invention are also directed to a silicon-containing compound suitable for use as an additive for lithium secondary battery electrolyte and a method of preparing the silicone-containing compound.

According to an embodiment of the present invention, an electrolyte for a rechargeable lithium battery includes a lithium salt and a silicone-containing compound represented by Formula 1:

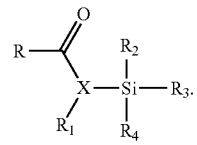

Formula 1

In Formula 1, is nitrogen (N) or phosphorous (P); R and $R_1$ are each independently a hydrogen atom, a hydroxy group, a cyano group, $OR_x$ (where $R_x$ is a C1-C6 alkyl group or a C6-C20 aryl group), —C(=O)$R_a$, —C(=O)O$R_a$, —OC(=O)$R_a$, —OC(=O)(ORa), —N$R_b$$R_c$, a substituted or unsubstituted C1-C6 alkyl group, a substituted or unsubstituted C1-C6 alkoxy group, a substituted or unsubstituted C2-C6 alkenyl group, a substituted or unsubstituted C2-C6 alkynyl group, a substituted or unsubstituted C3-C12 cycloalkyl group, a substituted or unsubstituted C6-C20 aryl group, a substituted or unsubstituted C6-C20 aryloxy group, or a substituted or unsubstituted C6-C20 heteroaryl group; $R_2$, $R_3$, and $R_4$ are each independently a cyano group, —$OR_y$ (where $R_y$ is a C1-C12 alkyl group, or a C6-C12 aryl group), —C(=O)$R_a$, —C(=O)O$R_a$, —OC(=O)$R_a$, —OC(=O)(O$R_a$), —N$R_b$$R_c$, a substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group. $R_a$ may be a hydrogen atom, an unsubstituted C1-C10 alkyl group, a C1-C10 alkyl group substituted with a halogen atom, an unsubstituted C6-C12 aryl group, a C6-C12 aryl group substituted with a halogen atom, an unsubstituted C6-C12 heteroaryl group, or a C6-C12 heteroaryl group substituted with a halogen atom; and $R_b$ and $R_c$ are each independently a hydrogen atom, an unsubstituted C1-C10 alkyl group, a C1-C10 alkyl group substituted with a halogen atom, an unsubstituted C2-C10 alkenyl group, a C2-C10 alkenyl group substituted with a halogen atom, an unsubstituted C3-C12 cycloalkyl group, a C3-C12 cycloalkyl group substituted with a halogen atom, an unsubstituted C6-C12 aryl group, a C6-C12 aryl group substituted with a halogen atom, an unsubstituted C6-C12 heteroaryl group, a C6-C12 heteroaryl group substituted with a halogen atom, or —Si($R_d$)$_3$, where $R_d$ in —Si($R_d$)$_3$ is a C1-C10 alkyl group. In Formula 1, when R is $CF_3$: all of $R_2$ to $R_4$ are the same; or one or more of $R_2$ to $R_4$ is selected from a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group; or $R_2$ to $R_4$ are each independently a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a primary substituted or unsubstituted C1-C12 alkyl group, a secondary substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group.

In one embodiment, in Formula 1, when one or more of R, $R_1$, $R_2$, $R_3$, or $R_4$ is a substituted group, a substituent of the substituted group is a halogen atom, a C1-C10 alkyl group substituted with a halogen atom, a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C10 alkyl group, a C2-C10 alkenyl group, a C2-C10 alkynyl group, or a C1-C10 heteroalkyl group.

In one embodiment, in Formula 1, X is nitrogen (N).

In one embodiment, in Formula 1, X is nitrogen (N); R and $R_1$ are each independently a C1-C6 alkyl group, or a C1-C6 alkyl group substituted with one or more of a halogen atom; and $R_2$, $R_3$, and $R_4$ are each independently a C1-C12 alkyl group, a C1-C12 alkyl group substituted with one or more of a halogen atom, a C2-C12 alkenyl group, or a C2-C12 alkenyl group substituted with one or more of a halogen atom.

In one embodiment, in Formula 1, one or more of R, $R_1$, $R_2$, $R_3$, or $R_4$ includes an alkene group.

In one embodiment, in Formula 1, one or more of R, $R_1$, $R_2$, $R_3$, or $R_4$ is an electron-withdrawing group.

In one embodiment, in Formula 1, one or more of R, $R_1$, $R_2$, $R_3$, or $R_4$ is substituted with a fluorine atom.

In one embodiment, in Formula 1, one or more of R, $R_1$, $R_2$, $R_3$, or $R_4$ is a perfluorinated alkyl group.

In one embodiment, in Formula 1, one or more of R, $R_1$, $R_2$, $R_3$, or $R_4$ is a linear C1 to C3 alkyl group, a C1 to C3 alkenyl group, a C1 to C3 alkyl group substituted with one or more of a halogen atom, or a C1 to C3 alkenyl group substituted with one or more of a halogen atom.

In one embodiment, the silicone-containing compound represented by Formula 1 is one of Compounds 1 to 4:

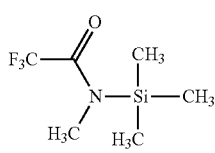

1

-continued

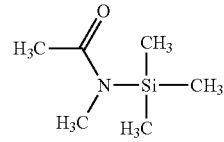

2

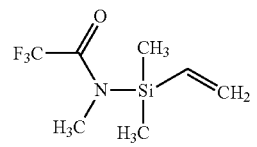

3

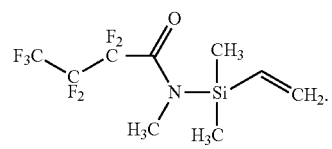

4

In one embodiment, the silicone-containing compound represented by Formula 1 is present in the electrolyte in an amount of about 0.01 wt % to about 25 wt % based on a total weight of the electrolyte.

In one embodiment, the silicone-containing compound represented by Formula 1 is present in the electrolyte in an amount of 0.01 wt % to about 15 wt % based on a total weight of the electrolyte.

In one embodiment, the silicone-containing compound represented by Formula 1 is present in the electrolyte in an amount of about 0.01 wt % to about 10 wt % based on a total weight of the electrolyte.

In one embodiment, the lithium salt present in the electrolyte includes $LiPF_6$.

In one embodiment, the electrolyte further includes $LiPO_2F_2$.

In one embodiment, the $LiPO_2F_2$ is present in the electrolyte in an amount of about 0.01 wt % to about 15 wt % based on a total weight of the electrolyte.

In one embodiment, the $LiPO_2F_2$ is present in the electrolyte in an amount of about 0.01 wt % to about 3 wt %, based on a total weight of the electrolyte.

In one embodiment, the lithium salt is present in the electrolyte in a concentration of about 0.1M to about 2.0M.

In one embodiment, the $LiPF_6$ is present in the electrolyte in a concentration of about 0.1M to about 2.0M.

In one embodiment, the electrolyte includes a nonaqueous organic solvent.

According to another embodiment of the present invention, an electrolyte for a lithium secondary battery includes a lithium salt; a nonaqueous organic solvent; and an electrolyte including the above-described silicone-containing compound. represented by Formula 1.

According to a further embodiment of the present invention, a lithium secondary battery includes as cathode including a cathode active material capable of intercalating and deintercalating lithium, an anode including an anode active material capable of intercalating and deintercalating lithium, and the electrolyte including the silicone-containing compound represented by Formula 1.

In one embodiment, the rechargeable lithium battery further includes a solid electrolyte interface (SEI) layer on a surface of the anode, the solid electrolyte interface (SEI) layer including a reaction product of the silicone-containing compound represented by Formula 1.

In one embodiment, the solid electrolyte interface (SEI) layer has a thickness of about 0.1 nm to about 100 nm.

In one embodiment, the solid electrolyte interface (SEI) layer has a thickness of about 0.1 nm to about 80 nm.

In one embodiment, the solid electrolyte interface (SEI) layer has a thickness of about 0.5 nm to about 50 nm.

In one embodiment, the electrolyte of the rechargeable lithium battery includes a $PF_5$-amide complex. In one embodiment, the amide in the complex is cleaved from the silicone-containing compound represented by Formula 1.

According to one or more embodiments of the present invention, a silicone-containing compound of Formula 1 is used as an additive to of an electrolyte for a lithium secondary battery. In some embodiments, the silicone-containing compound of Formula 1 may form a solid electrolyte interface (SEI) as a thin film on a surface of an anode of the lithium secondary battery. In these embodiments, a side reaction between the anode and the electrolyte may be prevented or reduced, thus reducing or preventing generation of gas by decomposition of the electrolyte. According to embodiments of the present invention, the lithium secondary battery having this solid electrolyte interface (SEI) thin film may have improved high-temperature lifetime characteristics and high-temperature stability.

BRIEF DESCRIPTION OF THE DRAWINGS

These and/or other aspects of embodiments of the present invention will become apparent by reference to the following detailed description when considered together with the accompanying drawings, in which.

DETAILED DESCRIPTION

Figure 1:
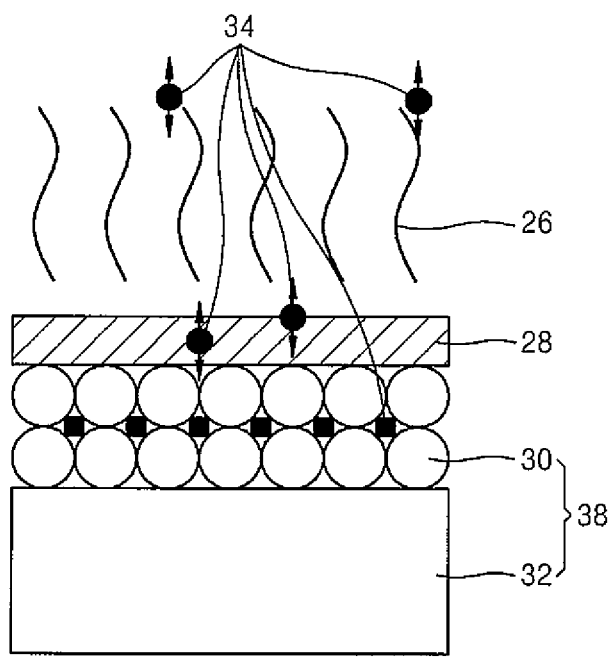
FIG. 1 is a schematic cross-sectional view illustrating a thin film formed on a surface of an anode of a lithium secondary battery, according to an embodiment of the present invention.

In the following detailed description, only certain embodiments of the present invention are shown and described, by way of illustration. For example, in the following detailed description, embodiments directed to a silicone-containing compound, an electrolyte for lithium secondary batteries including the silicone-containing compound, a lithium secondary battery including the electrolyte, and a method of preparing the silicone-containing compound are each described. As those skilled in the art would recognize, the described embodiments may be modified in-different ways, and therefore should not be construed as limiting. Embodiments are also described with reference to the accompanying drawings, in which like reference numerals refer to like elements throughout.

As used herein, the term "and/or," used with a list of elements, includes any and all combinations of one or more of the elements on the list, Expressions such as "at least one of," when preceding a list of elements, modify the entire list of elements and do not modify the individual elements of the list. The use of the term "may" when describing embodiments of the present invention refers to "one or more embodiments of the present invention." In the context of the present application, when a first element is referred to as being "on" a second element, it can be directly on the second element or be indirectly on the second element with one or more intervening elements.

According to an embodiment of the present invention, a silicone-containing compound is represented by Formula 1:

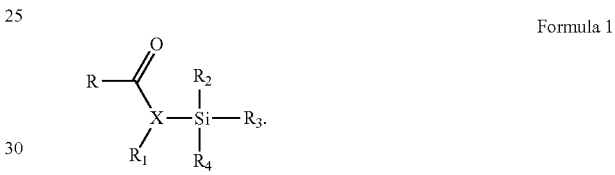

Formula 1

In Formula 1, X is nitrogen (N) or phosphorous (P); R and $R_1$ are each independently a hydrogen atom, a hydroxy group, a cyano group, $—OR_x$ (where $R_x$ is a C1-C6 alkyl group or a C6-C20 aryl group), $—C(=O)R_a$, $—C(=O)OR_a$, $—OC(=O)R_a$, $—OC(=O)(OR_a)$, $—NR_bR_c$, a substituted or unsubstituted C1-C6 alkyl group, a substituted or unsubstituted C1-C6 alkoxy group, a substituted or unsubstituted C2-C6 alkenyl group, a substituted or unsubstituted C2-C6 alkynyl group, a substituted or unsubstituted C3-C12 cycloalkyl group, a substituted or unsubstituted C6-C20 aryl group, a substituted or unsubstituted C6-C20 aryloxy group, or a substituted or unsubstituted C6-C20 heteroaryl group; $R_2$, $R_3$, and $R_4$ are each independently a cyano group, $—OR_y$ (where $R_y$ is a C1-C12 alkyl group, or a C6-C12 aryl group), $—C(=O)R_a$, $—C(=O)OR_a$, $—OC(=O)R_a$, $—OC(=O)(OR_a)$, $—NR_bR_c$, a substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group; $R_a$ is a hydrogen atom, an unsubstituted C1-C10 alkyl group, a C1-C10 alkyl group substituted with a halogen atom, an unsubstituted C6-C12 aryl group, a C6-C12 aryl group substituted with a halogen atom, an unsubstituted C6-C12 heteroaryl group, or a C6-C12 heteroaryl group substituted with a halogen atom; and $R_b$ and $R_c$ are each independently a hydrogen atom, an unsubstituted C1-C10 alkyl group, a C1-C10 alkyl group substituted with a halogen atom, an unsubstituted C2-C10 alkenyl group, a C2-C10 alkenyl group substituted with a halogen atom, an unsubstituted C3-C12 cycloalkyl group, a C3-C12 cycloalkyl group substituted with a halogen atom, an unsubstituted C6-C12 aryl group, a C6-C12 aryl group substituted with a halogen atom, an unsubstituted C6-C12 heteroaryl group, a C6-C12 heteroaryl group substituted with a halogen atom, or —Si(R$_d$)$_3$, wherein Rd in —Si(R$_d$)$_3$ is a C1-C10 alkyl group.

In Formula 1, when R is CF$_3$: all of R$_2$ to R$_4$ are the same; or one or more of R$_2$ to R$_4$ is a cyano group, —OR$_y$ (where R$_y$ is a C1-C12 alkyl group, or a C6-C12 aryl group), —C(=O)R$_a$, —C(=O)OR$_a$, —OC(=O)R$_a$, —OC(=O)(OR$_a$), —NR$_b$R$_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group; or R2 to R4 are each independently a cyano group, —OR$_y$ (where R$_y$ is a C1-C12 alkyl group, or a C6-C12 aryl group), —C(=O)R$_a$, —C(=O)OR$_a$, —OC(=O)R$_a$, —OC(=O)(OR$_a$), —NR$_b$R$_c$, a primary substituted or unsubstituted C1-C12 alkyl group, a secondary substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, or a substituted or unsubstituted C6-C12 heteroaryl group.

In Formula 1, the term "substituted" refers to substitution of at least one hydrogen atom of the substituent. The hydrogen atom may be substituted with a halogen atom, a C1-C10 alkyl group substituted with a halogen atom (e.g., CCF$_3$, CHCF$_2$, CH$_2$F, CCl$_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C10 alkyl group, a C2-C10 alkenyl group, a C2-C10 alkynyl group, or a C1-C10 heteroalkyl group (e.g., thiophen-2-yl, thiophen-3-yl, pyrrol-1-yl, pyrrol-2-yl, pyrrol-3-yl, or the like).

For example, one or more of R, R$_1$, R$_2$, R$_3$, or R$_4$ may be a substituted group, in which a substituent of the substituted group is selected from a halogen atom, a C1-C10 alkyl group substituted with a halogen atom, a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C10 alkyl group, a C2-C10 alkenyl group, a C2-C10 alkynyl group, or a C1-C10 heteroalkyl group.

In some embodiments, X is nitrogen (N).

In some embodiments, X is nitrogen (N); R and R$_1$ are each independently a C1-C6 alkyl group or a C1-C6 alkyl group substituted with one or more of a halogen atom; and R$_2$, R$_3$, and R$_4$ are each independently a substituted or unsubstituted C1-C12 alkyl group, a C1-C12 alkyl group substituted with one or more halogen atoms, a substituted or unsubstituted C2-C12 alkenyl group, or a C2-C12 alkenyl group substituted with one or more halogen atoms.

In some embodiments, one or more of R, R$_1$, R$_2$, R$_3$, or R$_4$ includes an alkene group. In some embodiments, one or more of R, R$_1$, R$_2$, R$_3$, or R$_4$ is an electron-withdrawing group (e.g., a group including and/or being substituted with an electron-withdrawing moiety, such as a halogen). In some embodiments, one or more of R, R$_1$, R$_2$, R$_3$, or R$_4$ is substituted with a fluorine atom. In some embodiments, one or more of R, R$_1$, R$_2$, R$_3$, or R$_4$ is a perfluorinated alkyl group. In some embodiments, one or more of R, R$_1$, R$_2$, R$_3$, or R$_4$ is a linear C1 to C3 alkyl group, a C1 to C3 alkenyl group, a C1 to C3 alkyl group substituted with one or more of a halogen atom, or a C1 to C3 alkenyl group substituted with one or more of a halogen atom.

In some embodiments, the silicone-containing compound represented by Formula 1 includes at least one of Compounds 1 to 4:

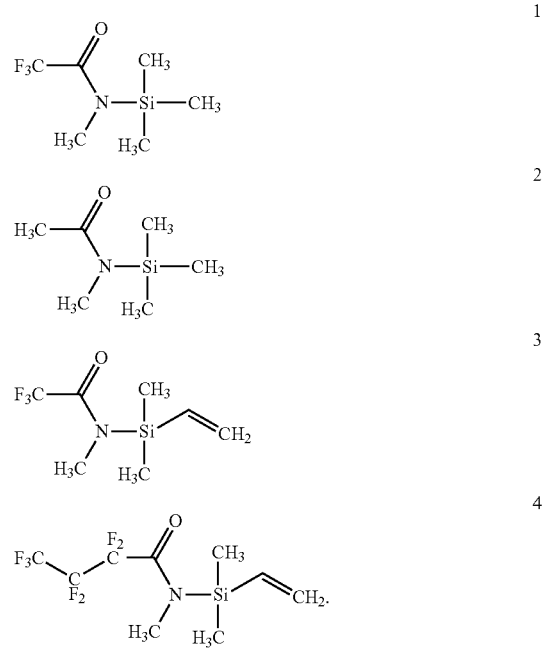

According to some embodiments, an electrolyte for a rechargeable lithium battery includes a lithium salt and the silicone-containing compound represented by Formula 1. Non-limiting examples of the lithium salt include LiPF$_6$ and LiPO$_2$F$_2$. The lithium salt may include a combination of two or more lithium salts.

In some embodiments, X is nitrogen (N) or phosphorous (P), and the silicone-containing compound represented by Formula 1 may thus include a nitrogen (N) or a phosphorous (P) with non-covalent electron pair. For example, the silicone-containing compound may include nitrogen (N) with non-covalent electron pair.

In an electrolyte for a rechargeable lithium battery, decomposition of a lithium salt included in the electrolyte may occur (e.g., by thermal decomposition of the lithium salt and/or by reaction of the lithium salt with impurities such as H$_2$O). For example, in an electrolyte including LiPF$_6$ and an organic solvent (e.g., a carbonate-based solvent), LiPF$_6$ may decompose to form byproducts such as HF and PF$_5$. In the presence of these byproducts, a side reaction of the organic solvent may occur. This side reaction may cause decomposition the electrolyte.

According to embodiments of the present invention, in an electrolyte including the silicone-containing compound represented by Formula 1, the presence of lithium salt decomposition byproducts may be reduced and thus decomposition of the electrolyte may be suppressed.

In some embodiments, the electrolyte includes LiPF$_6$ and a PF$_5$-amide complex may be formed in the electrolyte. The amide of the PF$_5$-amide complex may be cleaved from the silicone-containing compound represented by Formula 1

(e.g., being formed by a reaction of the silicone-containing compound represented by Formula 1 with HF). The amide (a Lewis base) cleaved from silicone-containing compound represented by Formula 1 may serve as an electron donor to form a Lewis acid-Lewis base complex with the PF$_5$ Lewis acid byproduct of LiPF$_6$ decomposition (see e.g., Reaction Scheme 1 showing an example of the amide (Compound 6), alone and as part of a Lewis acid-Lewis base complex with PF$_5$). Thus, in some embodiments, lithium salt decomposition byproducts in the electrolyte may be reduced by converting the byproducts into less reactive compounds and/or complexes. Accordingly, a side reaction of the lithium salt (e.g., LiPF$_6$) with the organic solvent (e.g., the carbonate-based organic solvent) may be suppressed.

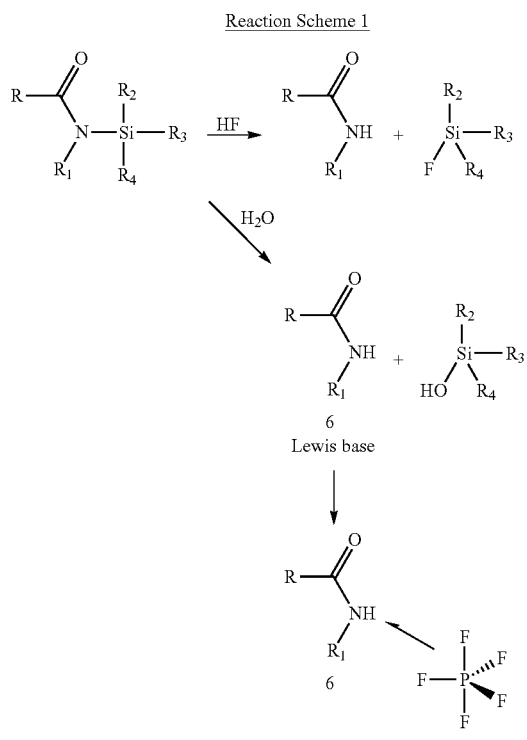

Reaction Scheme 1

According to some embodiments, when the silicone-containing compound represented by Formula 1 is included in the electrolyte, a solid electrolyte interface (SEI) with low resistance may be formed, for example, due to improvement in stability and conductivity of the electrolyte. Thus, in some embodiments, a lithium secondary battery including the electrolyte with the silicone-containing compound represented by Formula 1 as an additive, has improved high-temperature lifetime characteristics and high-temperature stability.

In some embodiments, the silicone-containing compound includes a substituent substituted with an electron-withdrawing moiety, such as a halogen. For example, the substituent may be a C1-C6 alkyl group substituted with a halogen atom electron-withdrawing moiety. In some of these embodiments, the substituent may serve as an electron-withdrawing group, as carbons adjacent to the electron-withdrawing moiety (e.g., carbons adjacent to the halogen) may have a partial positive charge ($\delta^+$). In some of these embodiments, the silicone-containing compound may reduce the presence of lithium salt byproducts (e.g., byproducts formed by decomposition of LiPF$_6$) in the electrolyte, and thus may suppress or reduce decomposition of the electrolyte.

When the silicone-containing compound includes a substituted or unsubstituted C2-C12 alkenyl group, a C2-C12 alkenyl group substituted with a halogen atom, the alkene substituent may form a single bond by accepting electrons from dissociated lithium salt anions (e.g., PF$_6^-$) dissolved in the electrolyte. Forming of single bonds may facilitate formation of a solid electrolyte interface (SEI) layer on the surface of the anode.

According to another embodiment of the present invention, an electrolyte for a lithium secondary battery includes a lithium salt, a nonaqueous organic solvent, and the silicone-containing compound represented by Formula 1.

An amount of the silicone-containing compound represented by Formula 1 present in the electrolyte may be about 0.01 wt % to about 25 wt %, about 0.01 wt % to about 15 wt %, or about 0.01 wt % to about 10 wt %, based on a total weight of the electrolyte. When the amount of the silicone-containing compound represented by Formula 1 is present in the electrolyte of a lithium secondary battery in any one of these amounts, electrochemical stability and thermal stability of the electrolyte may be improved without deteriorating performance of the lithium secondary battery.

The electrolyte for the lithium secondary battery may further include lithium difluorophosphate (LiPO$_2$F$_2$). When lithium difluorophosphate is further included in the electrolyte, a more stable SEI layer may be formed on the surface of the anode, which may reduce resistance of the lithium secondary battery. Accordingly, in some embodiments, the lithium secondary battery may have improved high-temperature-lifetime characteristics and high-temperature stability.

In some embodiments, the SEI layer includes a reaction product of the silicone-containing compound represented by Formula 1.

An amount of lithium difluorophosphate (LiPO$_2$F$_2$) present in the electrolyte may be—about 0.01 wt % to about 5 wt % or about 0.01 wt % to about 3 wt %, based on a total weight of the electrolyte. When the amount of the lithium difluorophosphate (LiPO$_2$F$_2$) is present in the electrolyte in any one of these amounts, the lithium secondary battery may have reduced resistance during high-temperature storage, and may thus have improved high-temperature stability.

Non-limiting examples of the lithium salt include LiPF$_6$, LiBF$_4$, LiSbF$_6$, LiAsF$_6$, LiCF$_3$SO$_3$, Li(CF$_3$SO$_2$)$_3$C, Li(CF$_3$SO$_2$)$_2$N, LiC4F$_9$SO$_3$, LiClO$_4$, LiAlO$_2$, LiAlCl$_4$, LiBPh$_4$, LiN(C$_x$F$_{2x+1}$SO$_2$)(C$_y$F$_{2y+1}$SO$_2$) (where x and y are non-zero natural numbers), LiCl, LiI, LiBOB (lithium bis (oxalato)borate), and combinations thereof. The lithium salt may be dissolved in a nonaqueous organic solvent and serves as a source of lithium ions or operating the lithium secondary battery.

A concentration of the lithium salt is not specifically limited. In some embodiments, the lithium salt may be present in the electrolyte in a concentration of about 0.1M to about 2.0M. In some of these embodiments, the electrolyte may have improved performance, and may maintain a viscosity suitable to improve the mobility of the lithium ions.

Non-limiting examples of the nonaqueous organic solvent include a carbonate-based solvent, an ester-based solvent, an ether-based solvent, a ketone-based solvent, an alcohol-based solvent, an aprotic solvent, and a combination thereof. Non-limiting examples of these nonaqueous organic solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), fluoro ethylene carbonate (FEC), methyl acetate, ethyl acetate, n-propyl acetate, dimethylacetate, methyl propionate (MP), ethylpropionate (EP), ethylbutyrate(EB), γ-butyrolactone, decanolide, γ-valero lactone, mevalonolactone, caprolactone, dibutyl ether, tetraglyme, diglyme, dimethoxyethane, 2-methyltetrahydrofuran, tetrahydrofuran (THF), cyclohexanone, ethylalcohol, isopropylalcohol, $R_e$—CN (in which $R_e$ is a substituted or unsubstituted C2-C20 hydrocarbon groups, which may be linear, branched, or cyclic, and optionally includes a double bond, an aromatic ring, or an ether bond), dimethylsulfoxide (DMSO), dimethylformamide, dimethylacetamide (DMAC), 1,3-dioxolane, sulfolane, and a combination thereof.

For example, the nonaqueous organic solvent may include one or more carbonate-based solvents. The carbonate-based solvent may include a combination of a cyclic carbonate and a linear carbonate, which may be selected based on the desired dielectric constant and viscosity of the resulting combination of carbonate solvents. For example, a combination of a cyclic carbonate and a linear carbonate in a volume ratio of about 1:1 to about 1:9 may be used.

The nonaqueous organic solvent may further include an aromatic hydrocarbon-based organic solvent in combination with the carbonate-based solvent. The carbonate-based solvent and the aromatic hydrocarbon-based organic solvent may be present, for example, in a volume ratio of about 1:1 to about 30:1.

Non-limiting examples of the aromatic hydrocarbon-based organic solvent include an aromatic hydrocarbon-based compound represented by Formula 2:

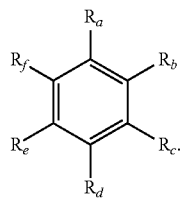

Formula 2

In Formula 2, $R_a$ to $R_f$ may each independently be a hydrogen atom, a halogen atom, a C1-C10 alkyl group, or a haloalkyl group.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, a fluorotoluene, 2,3-difluorotoluene, 2,4-difluorotoluene, 2,5-difluorotoluene, 2,3,4-trifluorotoluene, 2,3,5-trifluorotoluene, a chlorotoluene, 2,3-dichlorotoluene, 2,4-dichlorotoluene, 2,5-dichlorotoluene, 2,3,4-trichlorotoluene, 2,3,5-trichlorotoluene, an iodotoluene, 2,3-diiodotoluene, 2,4-diiodotoluene, 2,5-diiodotoluene, 2,3,4-triiodotoluene, 2,3,5-triiodotoluene, xylene, and combinations thereof.

According to another embodiment of the present invention, a lithium secondary battery includes: a cathode including a cathode active material capable of intercalating and deintercalating lithium; an anode including an anode active material capable of intercalating and deintercalating lithium; and an electrolyte between the cathode and the anode. The electrolyte includes a lithium salt, a nonaqueous organic solvent, and the silicone-containing compound represented by Formula 1.

The lithium salt, the nonaqueous organic solvent, and the silicone-containing compound of Formula 1 included in the lithium secondary battery, include those already described above with reference to the electrolyte.

In the lithium secondary battery, the anode may include a thin film on a surface thereof. The thin film may be a layer partially or entirely derived from the silicone-containing compound of Formula 1 in the electrolyte (e.g., a layer including or consisting of a reaction product of the silicone-containing compound represented by Formula 1), that is, the thin film is not a layer formed by an additional coating of a surface of the anode.

According to some embodiments, because the silicone-containing compound represented by Formula 1 in the electrolyte of the lithium secondary battery forms the thin film on the surface of the anode, the amount of the silicone-containing compound remaining in the electrolyte may be reduced during operation of the lithium secondary battery.

For example, the amount of the silicone-containing compound present in the electrolyte after operation of the lithium secondary battery may be smaller than the amount of the silicone-containing compound present before the operation of the lithium secondary battery.

When the silicone-containing compound of Formula 1 is in the electrolyte of a lithium secondary battery, a solid electrolyte interface (SEI) layer with low resistance may be formed, for example, due to improvement in stability and conductivity of the electrolyte. Accordingly, in some embodiments, the lithium secondary battery including the electrolyte may have improved high-temperature lifetime characteristics and high-temperature stability.

In some embodiments, the lithium secondary battery includes a silicone-containing compound represented by Formula 1 having a substituent which is substituted with an electron-withdrawing moiety (e.g., substituted with a halogen atom as the electron-withdrawing moiety). For example, in some embodiments, the substituent of the silicone-containing compound may be a C1-C6 alkyl group substituted with a halogen atom. In these and other embodiments, as carbons adjacent to the electron-withdrawing moiety may have a partial positive charge ($\delta^+$), the substituent may serve as electron withdrawing group. Thus, in some embodiments, when a substituent of the silicone-containing compound represented by Formula 1 is an electron-withdrawing group (e.g., when one or more of R, $R_1$, $R_2$, $R_3$, or $R_4$ of Formula 1 is an electron-withdrawing group, such as C1-C6 alkyl group substituted with a halogen atom), the silicone-containing compound may react more readily with decomposition byproducts of the lithium salt (e.g., HF and/or $PF_5$ byproducts formed by decomposition of $LiPF_6$ present in the electrolyte). When the lithium secondary battery includes a silicone-containing compound of Formula 1 including a substituted or unsubstituted C2-C12 alkenyl group or a C2-C12 alkenyl group substituted with a halogen atom, this substituent may accept electrons from dissociated anions in the nonaqueous organic solvent (i.e., anions from the lithium salt dissolved in the electrolyte, such as $PF_6^-$ anions from dissolved $LiPF_6$) to form a single bond. The forming of the single bond may facilitate formation of a solid electrolyte interface (SEI) layer on the surface of the anode.

In some embodiments, the thin film formed on the surface of the anode has a thickness of about 0.1 nm to about 100 nm, about 0.1 nm to about 80 nm, or about 0.5 nm to about 50 nm. In some of these embodiments, the thin film may not adversely affect the transfer of lithium ions and may prevent or reduce direct contact between the electrolyte and the anode.

FIG. 1 is a schematic cross-sectional view illustrating a thin film formed on a surface of an anode of a lithium secondary battery, according to an embodiment of the present invention. Referring to FIG. 1, when a silicone-containing compound represented by Formula 1 is used as an additive in the electrolyte of the lithium secondary battery, a stable thin film 28 is formed on a surface of the anode 38 (the anode 38 including an anode current collector 32 and an anode active material layer 30), thereby enabling effective transfer of lithium ions 34 to the anode 38 via the electrolyte 26 as a medium.

Figure 2:
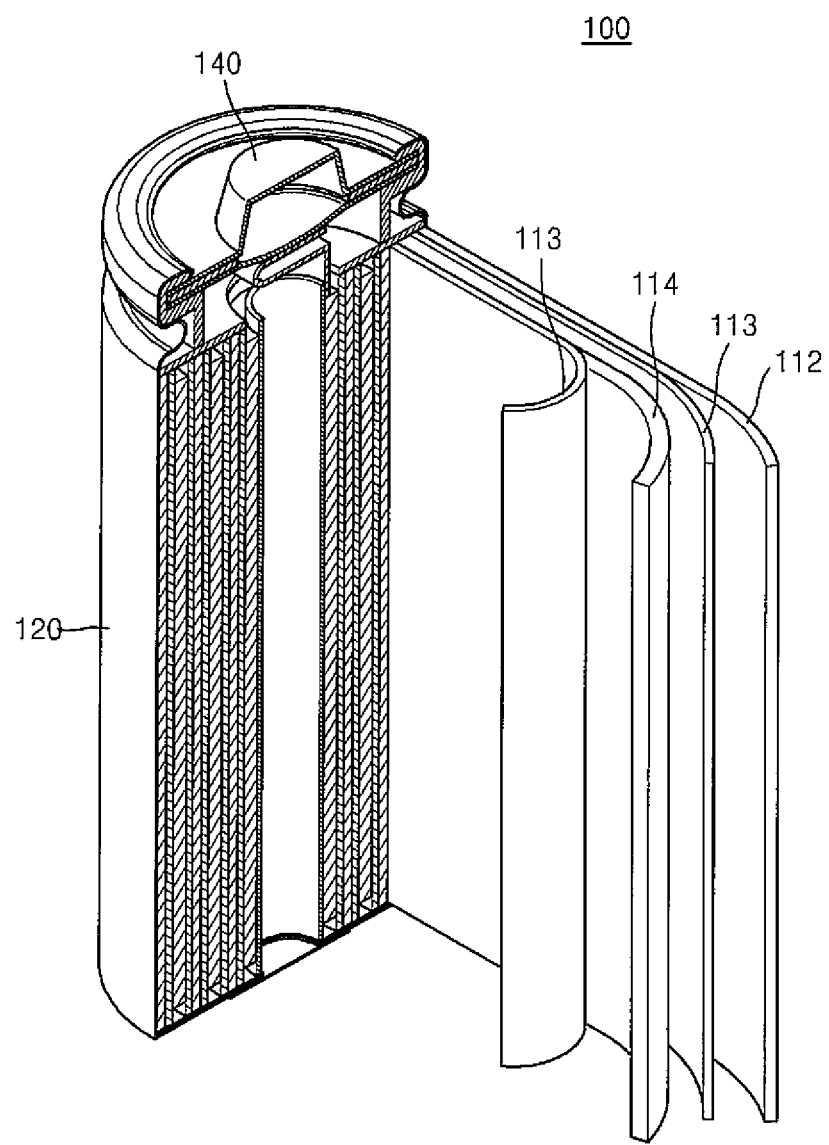
FIG. 2 is an exploded perspective view of a lithium secondary battery according to an embodiment of the present invention.

FIG. 2 is an exploded perspective view of a lithium secondary battery 100 according to an embodiment of the present invention. Although the lithium secondary battery 100 of FIG. 2 is cylindrical, the present invention is not limited thereto. Lithium secondary batteries according to embodiments of the present invention may be, for example, rectangular or pouch type batteries, for example.

Lithium secondary batteries may be classified as lithium ion batteries, lithium ion polymer batteries, or lithium polymer batteries, based on the kind of separator and/or electrolyte included therein. In addition, lithium batteries may be classified as cylindrical, rectangular, coin-shaped, or pouch batteries based on shape. Lithium batteries may also be classified as bulk type or thin film type based on size. Lithium secondary batteries according to embodiments of the present invention may have any suitable shape. The particular structure of the lithium secondary battery and a method of manufacturing include any suitable structures and methods of manufacturing which are commonly used in connection with lithium secondary batteries.

Referring to FIG. 2, a lithium secondary battery 100 in a cylindrical form includes an anode 112; a cathode 114; a separator 113—between the anode 112 and the cathode 114; an electrolyte impregnated into the anode 112, the cathode 114, and the separator 113; a battery case 120; and a sealing member 140 sealing the battery case 120. The lithium secondary battery 100 may be manufactured by sequentially stacking the anode 112, the cathode 114, and the separator 113 to form a stack, spirally rolling the stack, and placing the spirally rolled stack in the battery case 120.

The anode 112 includes a current collector and an anode active material layer disposed on the current collector. The anode active material layer includes an anode active material.

By way of example, the current collector of the anode may be made of copper (Cu), nickel (Ni), or stainless steel (SUS), depending on a desired voltage range. For example, the current collector of the anode may be a Cu current collector.

The anode active material is not specifically limited, and any suitable anode active material used in in lithium secondary batteries may be used. Non-limiting examples of the anode active material include lithium metal, a metal that is alloyable with lithium, a transition metal oxide, a material capable of doping or de-doping lithium, a material capable of reversibly intercalating and deintercalating lithium ions, and the like.

Non-limiting examples of the transition metal oxide include vanadium oxide, lithium vanadium oxide, and the like. Non-limiting examples of the material capable of doping or de-doping of lithium include silicon (Si), $SiO_x$ wherein $0<x<2$, a Si—Y alloy (where Y is an alkali metal, an alkali earth metal, a Group XIII element, a Group XIV element (excluding Si), a transition metal, a rare earth element, or combinations thereof, Sn, $SnO_2$, an Sn—Y alloy (where Y is an alkali metal, an alkali earth metal, a Group XIII element, a Group XIV element (excluding Sn), a transition metal, a rare earth element, or a combination thereof, and combinations thereof (e.g., combinations including $SiO_2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material capable of reversibly intercalating and deintercalating lithium ions may be for example, a suitable carbonaceous anode active material commonly used in a lithium ion secondary battery. Non-limiting examples of the material include crystalline carbon, amorphous carbon, and a combination thereof. Non-limiting examples of the crystalline carbon include graphite, such as natural graphite or artificial graphite-in amorphous, plate, flake, spherical or fibrous form Non-limiting examples of the amorphous carbon include soft carbon (i.e., carbon sintered at low temperatures), hard carbon, meso-phase pitch carbides, and sintered cokes.

The anode active material layer may include a binder. The anode active material layer may further include a conducting agent.

The binder binds anode active material particles to one another and to a current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent provides conductivity to the anode. Any suitable electron conducting material that does not induce chemical changes in lithium batteries may be used. Non-limiting examples of the conducting agent include natural graphite; artificial graphite; carbon black; acetylene black; ketjen black; carbon fibers; a metal powder or metal fiber of copper (Cu), nickel (Ni), aluminum (Al), silver (Ag), or the like; a conductive material, such as a polyphenylene derivative; and a combination thereof. The current collector may be made of a copper foil, a nickel foil, a stainless steel foil, a titanium foil, a nickel foam, a copper form, a polymeric substrate coated with a conductive metal, or a combination thereof.

Amounts of the anode active material, the binder, and the conducting agent include any amounts suitable for use in lithium secondary batteries. For example, a weight ratio of the anode active material to a mixture of the conducting agent and the binder may be about 98:2 to about 92: 8, but is not limited thereto. A mixing ratio of the conducting agent to the binder may be about 1:1.5 to about 1:3, but is not limited thereto.

The cathode 114 includes a current collector and a cathode active material layer on the current collector.

The current collector of the cathode 114 may be an aluminum (Al) current collector, but is not limited thereto.

The cathode active material is not specifically limited, and may be any cathode active material suitable for use in a lithium secondary battery. For example, the cathode active material may include a compound capable of reversibly intercalating and deintercalating lithium. The cathode active material may include at least one lithium composite oxide with a metal selected from cobalt, manganese, nickel, or a combination thereof. Non-limiting examples of the cathode active material include a compound represented by one of the following formulae: $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In these formulae, A may be nickel (Ni), cobalt (Co), manganese (Mn), or a combination thereof, but A is not limited thereto; B may be aluminum (Al), nickel (Ni), cobalt (Co), manganese (Mn), chromium (Cr), iron (Fe), magnesium (Mg), strontium (Sr), vanadium (V), a rare earth element, or a combination thereof, but B is not limited thereto; D may be oxygen (O), fluorine (F), sulfur (S), phosphorus (P), or a combination thereof, but D is not limited thereto; E may be cobalt (Co), manganese (Mn), or a combination thereof, but E is not limited thereto; F may be fluorine (F), sulfur (S), phosphorus (P), or a combination thereof, but F is not limited thereto; G may be aluminum (Al), chromium (Cr), manganese (Mn), iron (Fe), magnesium (Mg), lanthanum (La), cerium (Ce), strontium (Sr), vanadium (V), or a combination thereof, but G is not limited thereto; Q may be titanium (Ti), molybdenum (Mo), manganese (Mn), or a combination thereof, but Q is not limited thereto; I may be chromium (Cr), vanadium (V), iron (Fe), scandium (Sc), yttrium (Y), or a combination thereof, but I is not limited thereto; and J may be vanadium (V), chromium (Cr), manganese (Mn), cobalt (Co), nickel (Ni), copper (Cu), or a combination thereof, but J is not limited thereto.

Non-limiting examples of the cathode active materials include $LiCoO_2$, $LiNi_{1-x}Co_xO_2$ ($0 \leq x < 1$), $Li_{1-X}M_XO_2$ (where M is Mn or Fe, $0.03 < x < 0.1$), $Li[Ni_xCo_{1-2x}Mn_x]O_2$ ($0 < x < 0.5$), $Li[Ni_xMn_x]O_2$ ($0 < x \leq 0.5$), $Li_{1+x}(M)_{1-y}O_z$ ($0 < x \leq 1$, $0 \leq y < 1$, $2 \leq z \leq 4$, where M is a transition metal), $LiM_2O_4$ (M is Ti, V, or Mn), $LiM_xMn_{2-x}O_4$ (where M is a transition metal), $LiFePO_4$, $LiMPO_4$ (where M is Mn, Co, or Ni). $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_3$, $Cu_xV_2O_5$, $Cr_xV_6O_{13}$, $M_2(XO_4)_3$ (where M is a transition metal and X is S, P, As, Mo, or W), and $Li_3M_2(PO_4)_3$ (where M is Fe, V, or Ti).

For example, the cathode active material may include $Li_{1+x}M_{1-y}O_z$ (where M is at least one of Ni, Co, Mn, and Al, $0 \leq x \leq 1$, $0 \leq y \leq 1$, and $2 \leq z \leq 4$).

The cathode active material may have a coating layer on a surface thereof. In some embodiments, a mixture of a cathode active material without a coating layer and a cathode active material with a coating layer may be used. The coating layer may include at least one compound of a coating element, for example, a compound selected from an oxide, a hydroxide, an oxyhydroxide, an oxycarbonate, and a hydroxycarbonate of the coating element. A compound in the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed by any method that does not (or substantially does not) adversely affect the physical properties of the cathode active material during coating. For example, the coating layer may be formed by a spray coating method, a dipping method, or the like.

The cathode active material layer may include a binder. The cathode active material layer may further include a conducting agent.

The cathode active material may have an operating voltage of about 4.0V to about 5.5V. In some embodiments, the cathode active material having an operating voltage of about 4.0V to about 5.5V may be an over-lithiated oxide (OLO)-based cathode active material; or a 5V-cathode active material having a spinel structure.

The binder binds the cathode active material particles to one another and to the current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent provides conductivity to the cathode. Any suitable electron conducting material that does not induce chemical changes in a lithium secondary battery may be used. Non-limiting examples of the conducting agent include natural graphit; artificial graphite; carbon black; acetylene black; ketjen black; carbon fibers; a metal powder or metal fiber of copper (Cu), nickel (Ni), aluminum (Al), silver (Ag), or the like; a conductive material, such as a polyphenylene derivative; or a combination thereof.

Amounts of the cathode active material, the binder, and the conducting agent include any amounts suitable for use in lithium secondary batteries. For example, a weight ratio of the cathode active material to a mixture of the conducting agent and the binder may be about 98:2 to about 92:-8, but is not limited thereto. A mixing ratio of the conducting agent to the binder may be about 1:1.5 to about 1:3, but is not limited thereto.

The anode 112 and the cathode 114 may each be manufactured by mixing an active material, a binder, and a conducting agent in a solvent to prepare an active material composition, and coating the active material composition on a current collector. Any suitable or commonly used method of manufacturing electrodes for a lithium battery may be used. N-methylpyrrolidione may be used as a solvent, but the solvent is not limited thereto.

A separator may be included between the cathode and the anode, depending on the type of lithium battery. The separator may be a single layer separator or a multilayer separator including at least two layers. The layers may be made of materials such as polyethylene, polypropylene, polyvinylidene fluoride, or a combination thereof. Thus, the multilayer separator may be a mixed multilayer (i.e., including at least two layers made of different materials). For example, the separator may be a two-layered separator including a polyethylene layer and a polypropylene layer; a three-layered separator including a polyethylene layer, a polypropylene layer and a polyethylene layer, or a three-layered separator including a polypropylene layer, a polyethylene layer, and a polypropylene layer.

Hereinafter, embodiments of the present invention will be described with reference to the following Examples. However, these Examples are presented for illustrative purposes only and do not limit the scope of the present invention.

EXAMPLES

Preparation of an Electrolyte for a Lithium Secondary Battery

Example 1

Electrolyte for a Lithium Secondary Battery

About 1.0 wt % of Compound 1 was added to a mixed organic solvent including about 2.0 volume % of ethylene carbonate, about 4 volume % of ethyl methyl carbonate and about 4.0 volume % of dimethyl carbonate. LiPF$_6$ was then added to prepare an electrolyte for a lithium secondary battery having a 1.15 M concentration of LiPF$_6$.

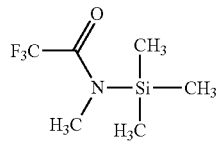

1

Example 2

Electrolyte for a Lithium Secondary Battery

An electrolyte for a lithium secondary battery was prepared in the same way as Example 1, except that about 2.0 wt % of Compound 1 was used as an additive instead of about 1.0 wt %.

Example 3

Electrolyte for a Lithium Secondary Battery

An electrolyte for a lithium secondary battery was prepared in the same way as Example 1, except that about 2.0 wt % of Compound 2 was used as an additive, instead of about 1.0 wt % of Compound 1.

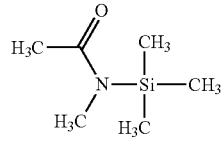

2

Example 4

Electrolyte for a Lithium Secondary Battery

An electrolyte for a lithium secondary battery was prepared in the same way as Example 1, except that about 2.0 wt % of Compound 3 was used as an additive, instead of about 1.0 wt % of Compound 1.

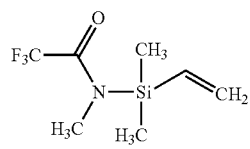

3

Compound 3 was prepared according to Reaction Scheme 2 or Reaction Scheme 3.

Reaction Scheme 2

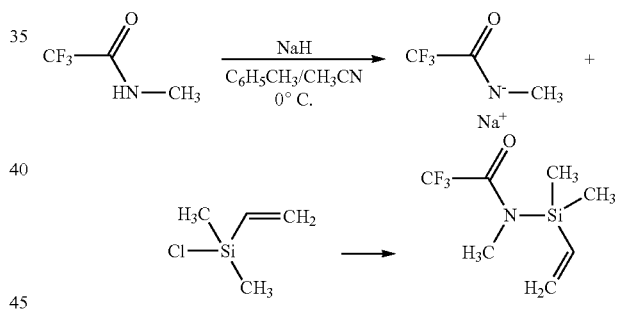

Reaction Scheme 3

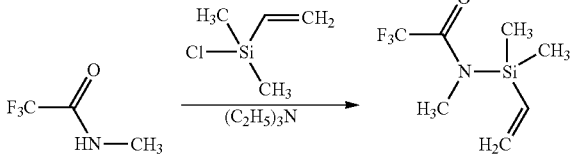

Example 5

Electrolyte for a Lithium Secondary Battery

An electrolyte for a lithium secondary battery was prepared in the same way as Example 1, except that about 2.0 wt % of Compound 4 was used as an additive instead of about 1.0 wt % of Compound 1.

19

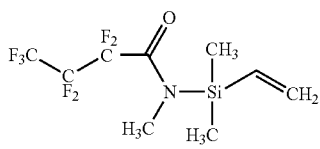

4

Compound 4 was prepared according to Reaction Scheme 4 or Reaction Scheme 5.

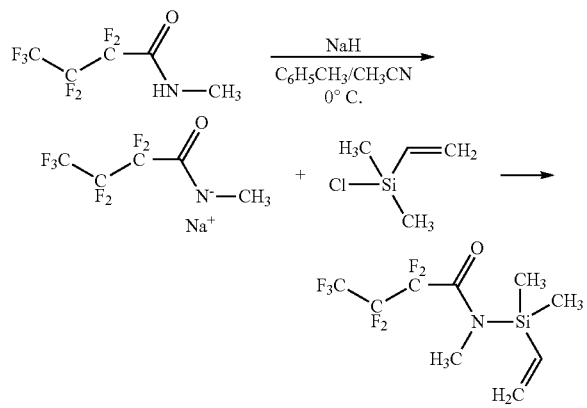

Reaction Scheme 4

Reaction Scheme 5

Example 6

Electrolyte for a Lithium Secondary Battery

About 1.0 wt % of Compound 1 was added to a mixed organic solvent including about 1.0 volume % of ethylene carbonate, about 4 volume % of ethyl methyl carbonate, about 4.0 volume % of dimethyl carbonate, and about 1.0 volume % of fluoroethylene carbonate. LiPF$_6$ was then added to prepare an electrolyte for a lithium secondary battery having a 1.15 M concentration of LiPF$_6$.

Example 7

Electrolyte for Lithium Secondary Battery

About 1.0 wt % of Compound 1 and about 1.0 wt % of LiPO$_2$F$_2$ were added to a mixed organic solvent including about 2.0 volume % of ethylene carbonate, about 4 volume % of ethyl methyl carbonate and about 4.0 volume % of dimethyl carbonate. LiPF$_6$ was then added to prepare an electrolyte for a lithium secondary battery having a 1.15 M concentration of LiPF$_6$.

Comparative Example 1

Electrolyte for a Lithium Secondary Battery

An electrolyte for a lithium secondary battery was prepared by adding LiPF$_6$ to a mixed organic solvent including about 2.0 volume % of ethylene carbonate, about 4.0 volume % of ethyl methyl carbonate and about 4.0 volume % of dimethyl carbonate, to prepare an electrolyte having a 1.15 M concentration of LiPF$_6$.

Comparative Example 2

Electrolyte for Lithium Secondary Battery

An electrolyte for a lithium secondary battery was prepared by adding LiPF$_6$ to a mixed organic solvent including about 1.0 volume % of ethylene carbonate, about 4.0 volume % of ethyl methyl carbonate, about 4.0 volume % of dimethyl carbonate, and 1.0 volumes % of fluoroethylene carbonate, to prepare an electrolyte having a 1.15 M concentration of LiPF$_6$.

Comparative Example 3

Electrolyte for Lithium Secondary Battery

About 1.0 wt % of LiPO$_2$F$_2$ and about 0.5 wt % of vinylene carbonate were added to a mixed organic solvent including about 2.0 volume % of ethylene carbonate, about 4.0 volume % of ethyl methyl carbonate and about 4.0 volume % of dimethyl carbonate. LiPF$_6$ was then added to prepare an electrolyte for a lithium secondary battery having a 1.15 M concentration of LiPF$_6$.

Comparative Example 4

Electrolyte for Lithium Secondary Battery

About 1.0 wt % of Compound 5 (N,O-bis(trimethylsilyl)trifluoroacetamide) was added to a mixed organic solvent including about 2.0 volume % of ethylene carbonate, about 4.0 volume % of ethyl methyl carbonate and about 4.0 volume % of dimethyl carbonate. LiPF$_6$ was then added to prepare an electrolyte for a lithium secondary battery having a 1.15 M concentration of LiPF$_6$.

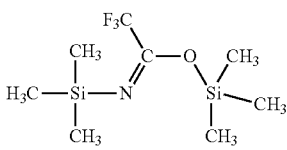

5

(Manufacturing of Half-Cell Lithium Secondary Batteries)

Example 8

Lithium Secondary Battery

LiNi$_{0.6}$Mn$_{0.2}$Co$_{0.2}$O$_2$ powder as a cathode active material, 5 wt % of polyvinylidene fluoride (PVdF) as a binder dissolved in N-methylpyrrolidone (NMP) and Denka Black as a conducting agent, were mixed in a weight ratio of 97:3:3 in an agate mortar to prepare a slurry. The slurry was bar-coated on an aluminum foil to a thickness of about 15 µm. The aluminum foil coated with the slurry was first dried in a 90° C. vacuum oven for about 2 hours to evaporate a portion of the NMP, and was then dried in a 120° C. vacuum oven for about 2 hours to more completely evaporate the NMP. The resulting electrode plate was roll-pressed. The electrode plate was cut into a 54 mm×250 mm cathode having an uncoated portion over a width of about 10 mm. An anode was prepared with 58 mm×280 mm of Cu foil. The anode with two separators individually positioned on the upper and the lower surface thereof, was wound together with the cathode to form a cylindrical structure. A cathode tab and an anode tab were then welded to the cylindrical structure, and the cylindrical structure was then placed in a cylindrical can and sealed, thereby manufacturing a half-cell lithium secondary battery. The electrolyte of Example 1 was injected into the cylindrical can, and the cylindrical can was clipped to manufacture an 18650 mini cell. The separators were prepared by coating surfaces of a polyethylene substrate (available from Asahi Co.) with $\alpha$-$Al_2O_3$ powder having an average particle diameter of about 50 nm.

Examples 9-15

Lithium Secondary Batteries 18650 mini cells were manufactured in the same way as Example 8, except that the electrolytes of Examples 2 to 8 were used, respectively, instead of the electrolyte of Example 1.

Comparative Examples 5-8

Manufacture of Lithium Secondary Batteries 18650 mini cells were manufactured in the same way as Example 8, except that the electrolytes of Comparative Examples 1 to 4 were used, respectively, instead of the electrolyte of Example 1.

Battery Performance Test

Evaluation Example 1

Evaluation of Lifetime Characteristics

Evaluation Example 1-1

Evaluation of Room-Temperature Lifetime Characteristics

Formation charging/discharging was performed twice on the lithium secondary batteries of Examples 8, 12, and 14 and Comparative Examples 7 and 8 at room temperature. The formation process included charging each of the lithium secondary batteries—at a constant current of about 0.2 C to a voltage of 4.2V (with respect to Li), followed by charging at a constant voltage of 4.2V to a 0.05 C current, and discharging at a constant current of 0.2 C to a voltage of 2.8V (with respect to Li). After the formation charging and discharging, each of the lithium secondary batteries was charged at a constant current of 0.5 C to a voltage of 4.2V (with respect to Li) and then discharged at a constant current of 0.2 C to a voltage of 2.8 V (with respect to Li). This charging and discharging condition is referred to as the "standard charging and discharging condition" and the discharge capacity in this condition is referred to as the "standard capacity".

Figure 3:
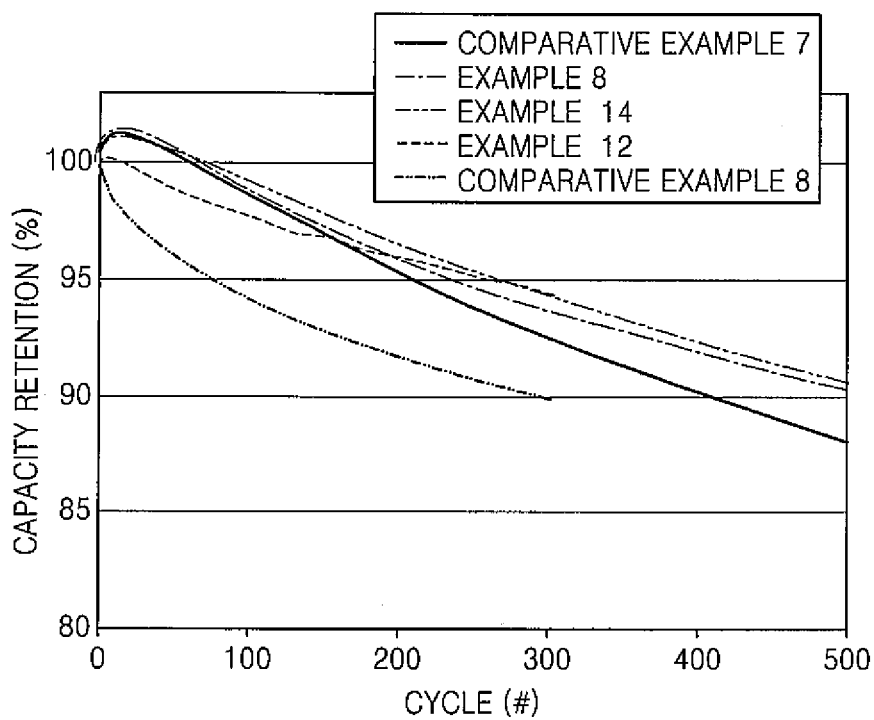
FIG. 3 is a graph of capacity retention rate as a function of cycle number of the lithium secondary batteries of Examples 8, 12 and 14 and Comparative Examples 7 and 8 at room temperature (25☐)

Subsequently, each of the lithium secondary batteries of Examples 8, 12, and 14 and Comparative Examples 7 and 8 were charged at a constant current of 1.5 C at about 25° C. to a voltage of 4.2V (with respect to Li), and then discharged at a constant current of about 1.5 C to a voltage of about 2.8 V (with respect to Li). This cycle of charging and discharging was repeated 300 times. Discharge capacities were measured for the lithium secondary batteries at each cycle up to 300. Discharge capacity retention (%) of each lithium secondary battery was calculated using Equation 1. The results are shown in FIG. 3 and Table 1.

$$\text{Discharge capacity retention[\%]} = [\text{Discharge capacity at } 300^{th} \text{ cycle/Discharge capacity at } 1^{st} \text{ cycle}] \times 100 \quad \text{Equation 1}$$

TABLE 1

| Example | Discharge capacity at $1^{st}$ cycle (mAh) | Discharge capacity at $300^{th}$ cycle (mAh) | Discharge capacity retention (%) |
|---|---|---|---|
| Example 8 | 177.9 | 166.8 | 93.8 |
| Example 12 | 162.0 | 153.1 | 94.5 |
| Example 14 | 177.5 | 167.6 | 94.4 |
| Comparative Example 7 | 179.3 | 166.0 | 92.6 |
| Comparative Example 8 | 162.3 | 146.0 | 90.0 |

Figure 5:
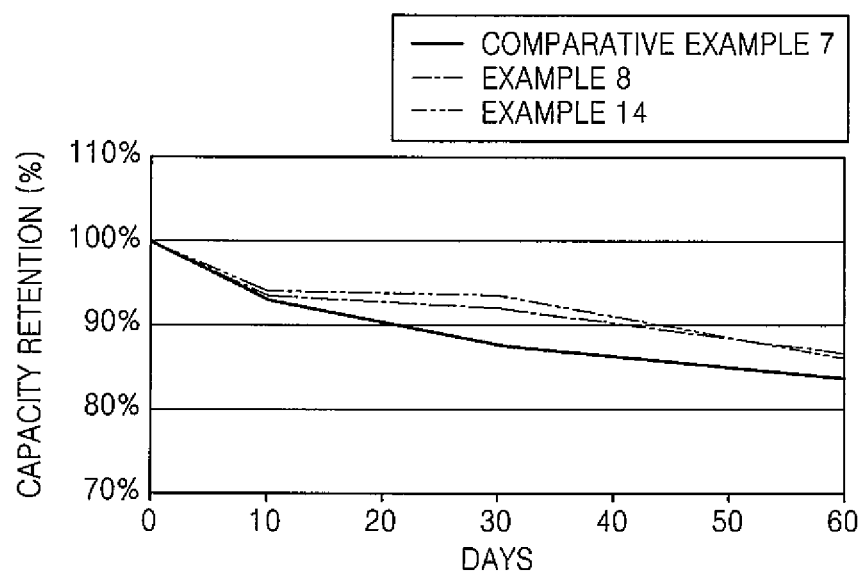
FIG. 5 is a graph of capacity reduction as a function of time at a high temperature (60☐) of the lithium secondary batteries of Examples 8 and 14 and Comparative Example 1.

Referring to FIG. 5 and Table 1, the lithium secondary batteries of Examples 8, 12, and 14 had improved capacity retention rates compared to the lithium secondary batteries of Comparative Examples 7 and 8.

Evaluation Example 1-2

Evaluation of High-Temperature Lifetime Characteristics

After formation charging and discharging of the lithium secondary batteries of Examples 8, 13 and 14 and Comparative Example 7, which was performed in the same way as in Evaluation Example 1-1, each of the lithium secondary batteries were charged at a constant current of 1.5 C in a constant-temperature chamber at 45° C. to a voltage of 4.25V (with respect to Li), and then discharged at a constant current of about 1.5 C to a voltage of about 2.8V (with respect to Li). This cycle of charging and discharging was repeated 300 times. Discharge capacities of the lithium secondary batteries were measured at a 1st cycle and a 300th cycle. Discharge capacity retention (%) of each lithium secondary battery was calculated using Equation 1. The results are shown in FIG. 4 and Table 2.

TABLE 2

| Example | Discharge capacity at $1^{st}$ cycle (mAh) | Discharge capacity at $300^{th}$ cycle (mAh) | Discharge capacity retention (%) |
|---|---|---|---|
| Example 8 | 192.95 | 172.9 | 89.6 |
| Example 13 | 178.1 | 167.8 | 94.2 |
| Example 14 | 193.2 | 177.2 | 91.7 |
| Comparative Example 7 | 193.6 | 171.7 | 88.7 |

Figure 4:
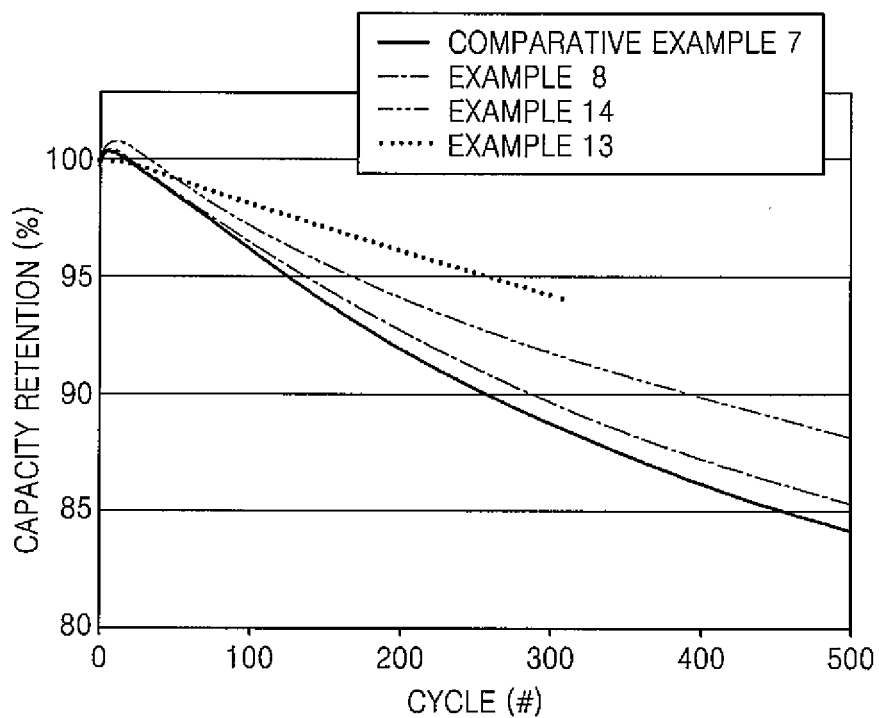
FIG. 4 is a graph of capacity retention rate as a function of cycle number of the lithium secondary batteries of Examples 8, 13 and 14 and Comparative Example 7 at a high temperature (45☐)

Referring to FIG. 4 and Table 2, the lithium secondary batteries of Examples 8, 13, and 14 each had an improved discharge capacity retention compared to the lithium secondary battery of Comparative Example 7.

Evaluation Example 2

Evaluation of Resistance Increase Rate after Storage

High-temperature storage capacities of the lithium secondary batteries of Examples 8 and 14 and Comparative Example 7 were evaluated after storage at about 60° C. The results are shown in FIG. 5.

The high-temperature storage capacities were evaluated as follows.

The lithium secondary batteries of Examples 8 and 14 and Comparative Example 7 were charged at room temperature (25° C.) at about 0.5 C to about 4.2V (cut-off current; 10 mA), rested for about 30 minutes, and then placed inside of an oven at a temperature of 60° C. for 30 days. Over the course of 30 days, each of the lithium secondary batteries was removed from the oven on the 0th day (i.e., not placed 60° C. oven), the 10th day, and the 30th day, and then discharged three times at about 0.5 C—The discharge capacity from the last measurement was used as a measure of the remaining capacity of each lithium secondary battery.

Referring to FIG. 5, the lithium secondary batteries of Examples 8 and 14 each had a smaller reduction in discharge capacity at about 60° C. compared to that of Comparative Example 7 at the same temperature. This indicates that the lithium secondary batteries of Examples 8 and 14 had improved stability at about 60° C. compared to the lithium secondary batteries of Comparative Example 7.

Evaluation Example 3

Cyclic Voltammetry Test

Cyclic voltammetry analysis was performed on the electrolytes of Example 2 and Comparative Example 1 to obtain cyclic voltammograms, as follows.

A graphite electrode as a working electrode, a lithium metal as a counter electrode, and a lithium metal electrode as a reference electrode were prepared. The cyclic voltammetry was performed on the electrolytes of Example 2 and Comparative Example 1 at voltages from about 0V to about 3.0V (vs. normal hydrogen electrode (NHE)) at a scan rate of about 1 mV/s using a potentiostat/galvanostat, and the above working, counter, and reference electrodes to measure current densities. The results are shown in FIG. 6.

Figure 6:
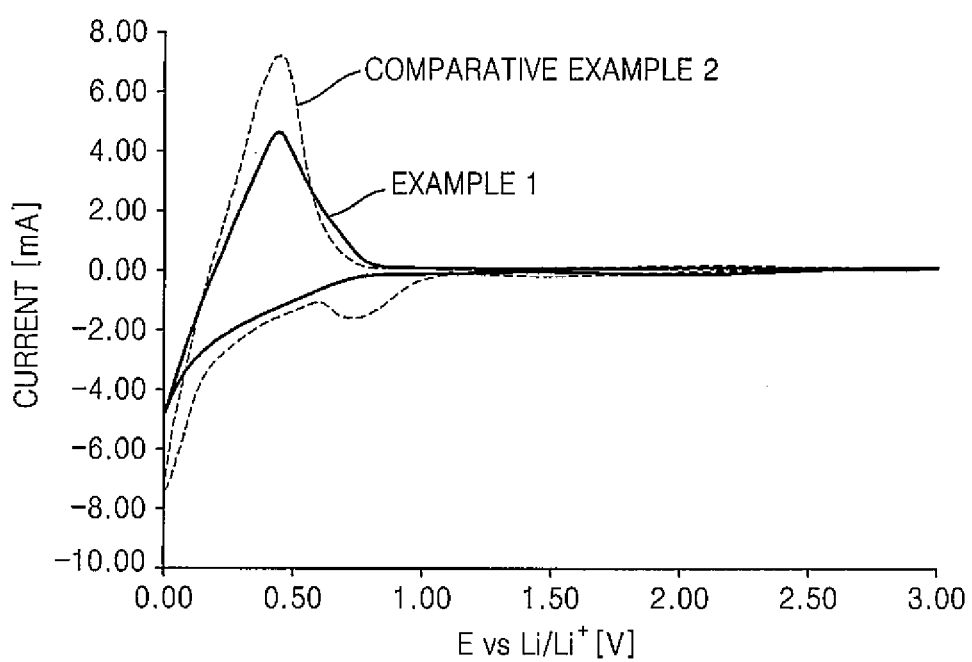
FIG. 6 shows cyclic voltammograms of the electrolyte of Example 2 and of the electrolyte of Comparative Example 1, independently.

Referring to FIG. 6, unlike the electrolyte of Comparative Example 1, the electrolyte of Example 2 showed a peak corresponding to lithium intercalation into graphite, and an irreversible peak from the surface of the graphite electrode after one cycle, indicating that the additive in the electrolyte of Example 2 formed a thin film on the graphite electrode.

Evaluation Example 4

Linear Sweep Voltammetry (LSV) Test

Linear sweep voltammetry (LSV) analysis was performed on the electrolytes of Example 2 and Comparative Example 1 to evaluate electrolytic behavior. The results are shown in FIG. 7.

Platinum (Pt) electrodes as a working electrode and a counter electrode, and a lithium metal electrode as a reference electrode were prepared for LSV analysis. The LSV analysis was performed on the electrolytes of Example 2 and Comparative Example 1 at voltages from about 3.0V to about 7.0V (vs. normal hydrogen electrode (NHE)) at a scan rate of about 1 mV/s using a potentiostat/galvanostat, and the above working, counter, and reference electrodes to measure current densities. The results are shown in FIG. 7.

Figure 7:
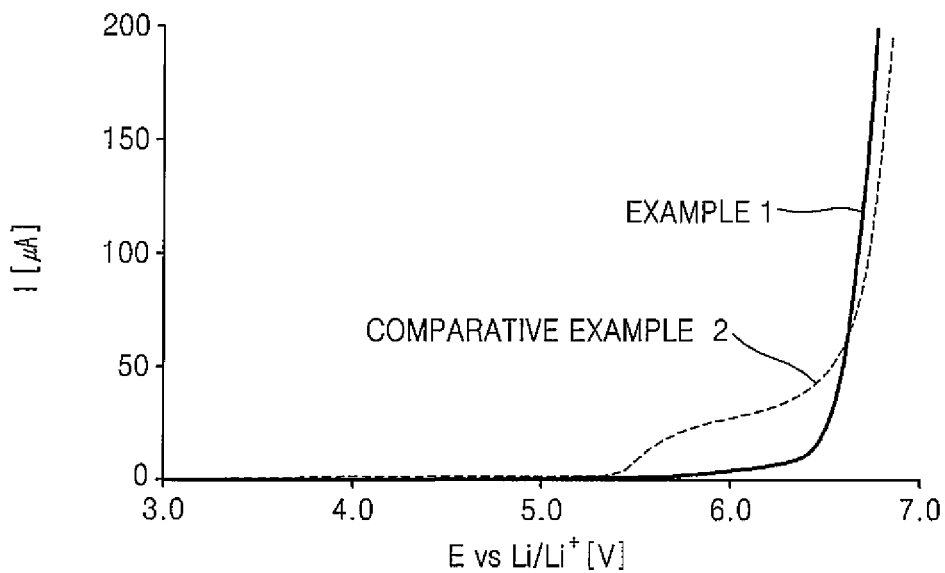
FIG. 7 shows linear sweep voltammograms (LSV) of the electrolyte of Example 2 and of the electrolyte of Comparative Example 1.

Referring to FIG. 7, the electrolyte of Example 2 showed a smaller current at a lower potential than the electrolyte of Comparative Example 1, showing that the electrolyte of Example 2 had a higher oxidation potential than that of the electrolyte of Comparative Example 1, and thus is more stable against oxidation.

Evaluation Example 5

Impedance Measurement

Impedances of the lithium secondary batteries of Example 9 and Comparative Example 5 were measured to provide an indication their respective resistances for comparison. The results are shown in FIG. 8.

Impedances were measured as follows. After formation charging and discharging of the lithium secondary batteries of Example 9 and Comparative Example 5 in the same way as in Evaluation Example 1-1, the lithium secondary batteries were charged at 25□ at a constant current of 1.5 C to a voltage of 4.2V (with respect to Li), followed by discharging at a constant current of about 1.5 C to a voltage of about 2.8V (with respect to LI). After repeating this cycle of charging and discharging five times, each of the lithium secondary batteries was charged at about 25□ at a current of about 100 mA and a voltage of about 4.2V to a cut-off current of about 10 mA, and then impedance was measured at a small excitation amplitude of about 5 mV to about 10 mV and a frequency of about 10 mHz to about 10 kHz. Using the same method, impedance was measured after repeating the cycle of charging and discharging 50 times for the lithium secondary batteries of Example 9 and Comparative Example 5.

Figure 8:
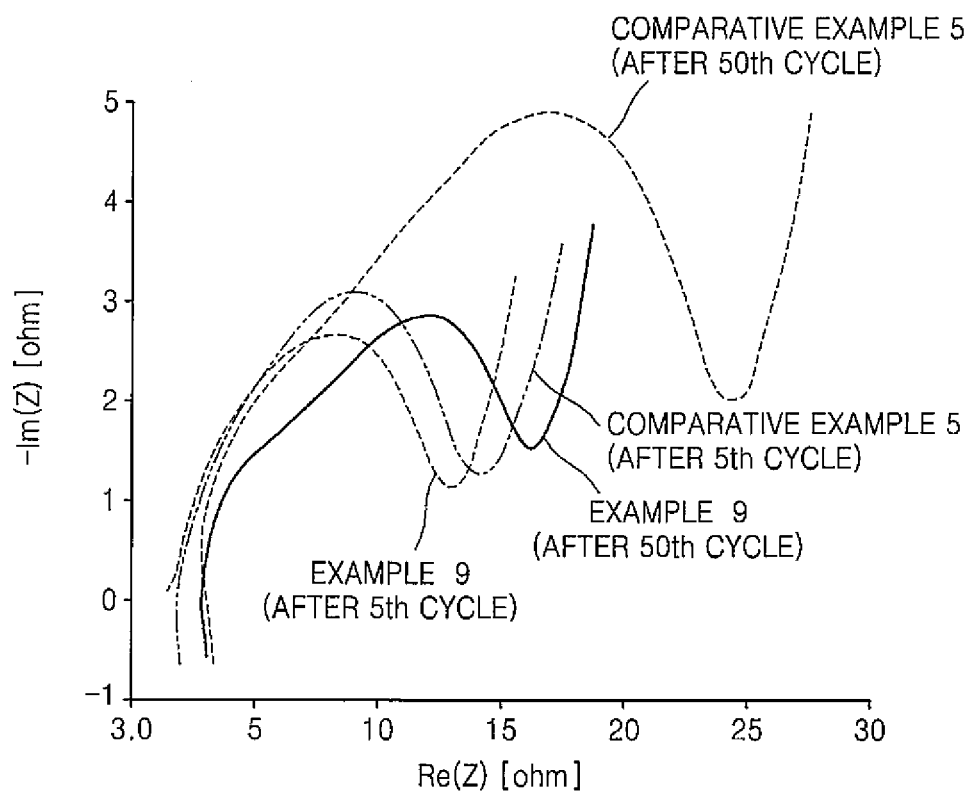
FIG. 8 is a graph showing impedance measurements conducted on lithium secondary batteries of Example 9 and Comparative Example 5, each after 5 cycles and 50 cycles.

In FIG. 8, Re(Z) on the horizontal axis represents a real impedance, and Im(Z) on the vertical axis represents an imaginary impedance.

Referring to FIG. 8, the size of the semi-circle in the impedance spectra of the lithium secondary batteries of Example 9 was smaller after 5 cycles and smaller after 50 cycles, compared to that of the lithium secondary battery of Comparative Example 5. This indicates that a thin film formed in the lithium secondary battery of Example 9 at an early stage of charging and discharging has a lower resistance than a film formed in the lithium secondary battery of Comparative Example 5, and that the thin film formed in the lithium secondary battery of Example 9 suppresses an increase in resistance with repeated charging and discharging. Such suppression may be attributed to the ability of the thin film in the lithium secondary battery of Example 9 to remain stable with repeated charging and discharging.

While the present invention has been described in connection with certain embodiments, those of ordinary skill in the art will understand that various modifications may be made to the disclosed embodiments without departing from the spirit and scope of the appended claims, and equivalents thereof.

What is claimed is:

1. An electrolyte for a rechargeable lithium battery comprising:
   a lithium salt; and
   a silicone-containing compound represented by Formula 1:

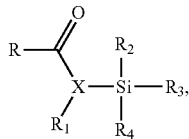

<Formula 1> wherein:
   X is nitrogen (N) or phosphorous(P);
   R and $R_1$ are each independently selected from the group consisting of a hydrogen atom, a hydroxy group, a cyano group, —$OR_x$ (where $R_x$ is a C1-C6 alkyl group or a C6-C20 aryl group), —C(=O)$R_a$, —C(=O)$OR_a$, —OC(=O)$R_a$, —OC(=O)($OR_a$), —$NR_bR_c$, a substituted or unsubstituted C1-C6 alkyl group, a substituted or unsubstituted C1-C6 alkoxy group, a substituted or unsubstituted C2-C6 alkenyl group, a substituted or unsubstituted C2-C6 alkynyl group, a substituted or unsubstituted C3-C12 cycloalkyl group, a substituted or unsubstituted C6-C20 aryl group, a substituted or unsubstituted C6-C20 aryloxy group, and a substituted or unsubstituted C6-C20 heteroaryl group;
   $R_2$, $R_3$, and $R_4$ are each independently selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group;
   at least one of $R_2$, $R_3$, and $R_4$ is selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group;
   $R_a$ is selected from the group consisting of a hydrogen atom, an unsubstituted C1-C10 alkyl group, a C1-C10 alkyl group substituted with a halogen atom, an unsubstituted C6-C12 aryl group, a C6-C12 aryl group substituted with a halogen atom, an unsubstituted C6-C12 heteroaryl group, and a C6-C12 heteroaryl group substituted with a halogen atom; and
   $R_b$ and $R_c$ are each independently selected from the group consisting of a hydrogen atom, an unsubstituted C1-C10 alkyl group, a C1-C10 alkyl group substituted with a halogen atom, an unsubstituted C2-C10 alkenyl group, a C2-C10 alkenyl group substituted with a halogen atom, an unsubstituted C3-C12 cycloalkyl group, a C3-C12 cycloalkyl group substituted with a halogen atom, an unsubstituted C6-C12 aryl group, a C6-C12 aryl group substituted with a halogen atom, an unsubstituted C6-C12 heteroaryl group, a C6-C12 heteroaryl group substituted with a halogen atom, and —Si($R_d$)$_3$, wherein $R_d$ in —Si($R_d$)$_3$ is a C1-C10 alkyl group,
   and wherein, when R is $CF_3$:
      all of $R_2$ to $R_4$ are the same and are selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group;
      one or more of $R_2$ to $R_4$ is selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group; or
      $R_2$ to $R_4$ are each independently selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OC(=O)($OR_a$), —$NR_bR_c$, a primary substituted or unsubstituted C1-C12 alkyl group, a secondary substituted or unsubstituted C1-C12 alkyl group, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group; wherein at least one of $R_2$, $R_3$, and $R_4$ is selected from the group consisting of a cyano group, —$OR_y$ (where $R_y$ is a C1-C12 alkyl group, or a C6-C12 aryl group), —C(=O)$R_a$, —C(=O)$OR_a$, —OC(=O)$R_a$, —OR(=O)($OR_a$), —$NR_bR_c$, a substituted or unsubstituted C1-C12 alkoxy group, a substituted or unsubstituted C2-C12 alkenyl group, a substituted or unsubstituted C2-C12 alkynyl group, a substituted or unsubstituted C3-C20 cycloalkyl group, a substituted or unsubstituted C6-C12 aryl group, a substituted or unsubstituted C6-C12 aryloxy group, and a substituted or unsubstituted C6-C12 heteroaryl group.

2. The electrolyte for a rechargeable lithium battery according to claim 1, wherein X is nitrogen (N).

3. The electrolyte for a rechargeable lithium battery according to claim 1, wherein when one or more of R, $R_1$, $R_2$, $R_3$, or $R_4$ is a substituted group, a substituent of the substituted group is selected from the group consisting of a halogen atom, a C1-C10 alkyl group substituted with a halogen atom, a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a C1-C10 alkyl group, a C2-C10 alkenyl group, a C2-C10 alkynyl group, and a C1-C10 heteroalkyl group.

4. The electrolyte for a rechargeable lithium battery according to claim 1, wherein:
X is nitrogen (N);
R and $R_1$ are each independently selected from the group consisting of a C1-C6 alkyl group, and a C1-C6 alkyl group substituted with one or more of a halogen atom; and
$R_2$, $R_3$, and $R_4$ are each independently selected from the group consisting of a C1-C12 alkyl group, a C1-C12 alkyl group substituted with one or more of a halogen atom, a C2-C12 alkenyl group, and a C2-C12 alkenyl group substituted with one or more of a halogen atom.

5. The electrolyte for a rechargeable lithium battery according to claim 4, wherein the silicone-containing compound represented by Formula 1 is selected from the group consisting of Compounds 3 to 4:

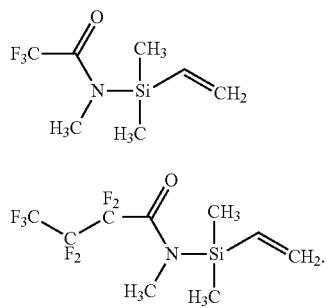

6. The electrolyte for a rechargeable lithium battery according to claim 1, wherein one or more of R, $R_1$, $R_2$, $R_3$, or $R_4$ comprises an alkene group.

7. The electrolyte for a rechargeable lithium battery according to claim 1, wherein one or more of R, $R_1$, $R_2$, $R_3$, or $R_4$ is an electron-withdrawing group.

8. The electrolyte for a rechargeable lithium battery according to claim 1, wherein one or more of R, $R_1$, $R_2$, $R_3$, or $R_4$ is substituted with a fluorine atom.

9. The electrolyte for a rechargeable lithium battery according to claim 1, wherein one or more of R, $R_1$, $R_2$, $R_3$, or $R_4$ is a perfluorinated alkyl group.

10. The electrolyte for a rechargeable lithium battery according to claim 1, wherein one or more of R, $R_1$, $R_2$, $R_3$, or $R_4$ is selected from the group consisting of a linear C1 to C3 alkyl group, a C1 to C3 alkenyl group, a C1 to C3 alkyl group substituted with one or more of a halogen atom, and a C1 to C3 alkenyl group substituted with one or more of a halogen atom.

11. The electrolyte for a rechargeable lithium battery according to claim 1, wherein the silicone-containing compound represented by Formula 1 is present in the electrolyte in an amount of about 0.01 wt % to about 25 wt % based on a total weight of the electrolyte.

12. The electrolyte for a rechargeable lithium battery according to claim 1, wherein the lithium salt comprises $LiPF_6$.

13. The electrolyte for a rechargeable lithium battery according to claim 12, further comprising $LiPO_2F_2$.

14. The electrolyte for a rechargeable lithium battery according to claim 13, wherein the $LiPO_2F_2$ is present in the electrolyte in an amount of about 0.01 wt % to about 15 wt % based on a total weight of the electrolyte.

15. The electrolyte for a rechargeable lithium battery according to claim 1, wherein the lithium salt is present in the electrolyte in a concentration of about 0.1 M to about 2.0 M.

16. The electrolyte for a rechargeable lithium battery according to claim 1, further comprising a nonaqueous organic solvent.

17. A rechargeable lithium battery comprising:
the electrolyte according to claim 1;
a cathode comprising a cathode active material capable of intercalating and deintercalating lithium; and
an anode comprising an anode active material capable of intercalating and deintercalating lithium.

18. The rechargeable lithium battery according to claim 17, further comprising a solid electrolyte interface (SEI) layer on a surface of the anode, the solid electrolyte interface (SEI) layer comprising a reaction product of the silicone-containing compound represented by Formula 1.

19. The rechargeable lithium battery according to claim 18, wherein the solid electrolyte interface (SEI) layer has a thickness of about 0.1 nm to about 100 nm.

20. The rechargeable lithium battery according to claim 17, wherein the electrolyte comprises a $PF_5$-amide complex, and wherein the amide in the complex is cleaved from the silicone-containing compound represented by Formula 1.

* * * * *